Oct. 7, 1952 W. F. KROEMMELBEIN, JR 2,612,824

TELEVISION PHOTOGRAPHIC DEVICE

Filed Aug. 9, 1950

INVENTOR.

W. F. KROEMMELBEIN, JR.

BY

Harry Sommers

ATTORNEY

Patented Oct. 7, 1952 2,612,824

UNITED STATES PATENT OFFICE 2,612,824

TELEVISION PHOTOGRAPHIC DEVICE

Walter F. Kroemmelbein, Jr.,
New Brunswick, N. J.

Application August 9, 1950, Serial No. 178,389

1 Claim. (Cl. 95—11)

This invention relates to a mechanism for photographing television images and is adapted to be used in connection with conventional television receiver sets which have a screen or tube on which the image broadcast is received. The invention will enable the viewer to photograph such of the specific images appearing on the screen of his home receiver set as he may wish, at the moment of reception, without resorting to any preliminary special adjustments or calculations. The invention is a simplified device for use in homes by the layman for photographically recording television program images of his selection.

Figure 1:
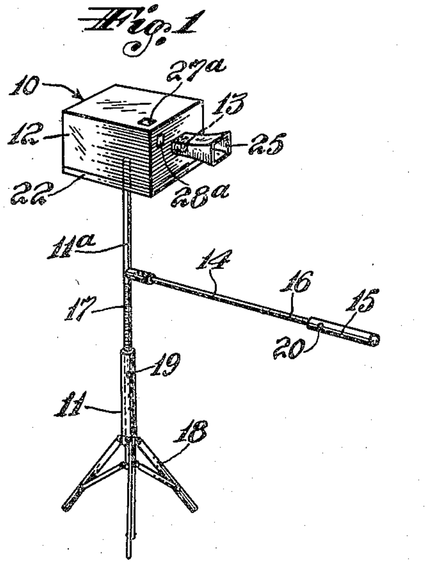
Fig. 1 is a perspective view of a device embodying the invention.

As shown in the drawings, the device comprises a photographic device, which is generally indicated by reference character 10 in Fig. 1, and which may be a still or motion picture camera, provided with a lens 13 which is preferably preset so as to be in proper focus for photographing television images when the device is properly used. The camera 10 may be positioned on a platform 22 or the like, or otherwise secured to an adjustable vertical support 11. The support 11 is adjustable so as to locate the lens at the elevational plane of the television set screen. That plane varies according to the type, style and make of set and, for that purpose the support 11 is preferably adjustable as to length, for example, by providing the same with section 11a telescopically received in the support 11 and provided with markings 17 to indicate the degree of extension of the section 11a out of support 11. The support 11 and its section 11a may be secured together in the finally adjusted position by any suitable means, such as by set screw 19 or the like. The support is provided with a base 18 which may be, as shown in Fig. 1, in the form of a collapsible tripod, or may be a fixed member, to rest on the floor of the room in which the device is to be used. The lens 13 is preferably provided with a hood 25 secured thereto to shield the lens from light other than that emanating from the television screen.

Figure 3:
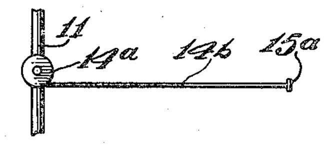
Fig. 3 is a fragmentary elevational view of a form of adjustable horizontal unit adapted to be used in carrying out the invention.
Figure 4:
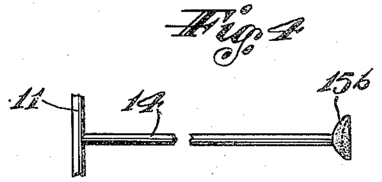
Fig. 4 is a fragmentary elevational view of another form of such unit.

A horizontal abutment rod 14 is provided to correctly horizontally space the lens 13 from the television screen. Rod 14 may be secured to the camera 12 or to the vertical support 11. The free end 15 of rod 14 is adapted to abut the television screen housing or cabinet T and may be formed in two or more sections telescopically or otherwise secured together, as is indicated in Fig. 1, wherein the free end section 15 is shown telescopically engaging the abutment rod 14 proper and fixed thereto by set screw or similar means 20. The abutment rod 14 may be provided with markings 16 to indicate the degree of movement of the free end section 15 thereon. The horizontal distance to be so calculated will generally vary in direct ratio to the size of the television screen in question. For the purpose of determining the correct horizontal distance, support 11 may have fixed thereto a housing 14a (Fig. 3) for a flexible tape 14b normally held therein under spring tension, said tape having a free end 15a to be moved into abutment with the television screen housing. The tape may have suitable inch or other markings thereon to enable the viewer to rapidly calculate the correct position for the support (and thereby the camera) relative to the television screen housing. The device 14a may be secured to the camera instead of to the support if so desired. In Fig. 4 the horizontal abutment rod 14 is shown provided at the free end thereof with suction cup 15b adapted to engage the television screen cabinet to stabilize the support relative thereto. It will be appreciated that the number of horizontal abutment rods may be increased as may also be the number of vertical support rods 11, within the spirit and scope of the invention. Suitable instructions may be printed up for use by the ultimate consumer indicating the correct vertical and horizontal distances required for various television sets and screen sizes and, by the means above described, the user may rapidly set or fix the position of the camera accordingly.

Figure 2:
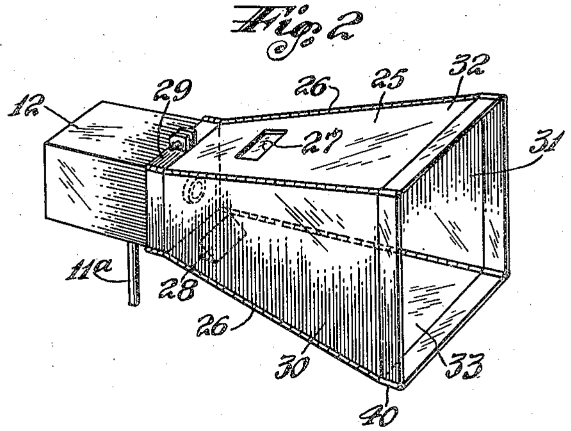
Fig. 2 is a fragmentary perspective view of another form thereof.

In Fig. 2, the camera is shown provided with a hood 25 which will serve the dual purpose of shielding the lens from light other than that emanating from the television screen and fixing the distance at which the camera is to be located relative to the television screen. The hood is preferably of a longitudinally rigid type, so that when it is moved to position its free end 40 into abutment with the television screen cabinet, the camera will automatically be located at the proper distance therefrom, dispensing with the need for the horizontal abutment rod 14. The free end 40 of the hood may be of a slightly yieldable material, such as rubber or the like, to prevent marring of the television cabinet or housing. The hood may be detachably secured to the camera, as, for example, by means of a frame 29 which will clamp said hood onto the camera, and may be of any desired cross section. As shown in Fig. 2, it may consist of a plurality of walls or panels 30, 31, 32, 33 hingedly connected together as at 26 to facilitate folding the hood when not in use.

Suitable means may be provided to enable the user to view the television screen while photographing the same. In the form shown in Fig. 1, the camera is provided with a mirror 28*a* which will reflect the image from the television screen upwardly and through a viewing opening 27*a*. In Fig. 2, the hood 25 is shown provided with a similar viewing opening 27 and is provided with a mirror 28 which will reflect the image from the screen and through said opening for observation by the user.

Figure 5:
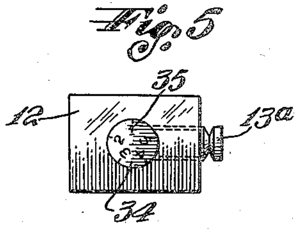
Fig. 5 is an elevational view of another form of camera unit which may be used in carrying out the invention.

The lens 13 is preferably pre-set so that adjustment thereof by the user will not be necessary, but means may be provided for reciprocating the lens in its mount to compensate for differences in size of screen and location of the camera relative to the television screen. In Fig. 5, this is indicated in a simple fashion by the dial 34 which is secured to the camera lens mount and is provided with markings 35 which may serve as a key previously calculated to the proper lens setting for relative distances and sizes of television screens. The dial is geared to the lens 13*a* so that lens 13*a* will be moved as the dial is rotated.

The specific illustrations in the drawing are by way of example only of the invention; many further modifications will be suggested thereby; such modifications as come within the terms of the appended claim are to be deemed to be within the spirit and scope of the invention.

Having thus described my invention, what I claim as new and desire to secure by Letters Patent is:

A prefocused television screen image photographic device comprising a supporting standard upon which a camera is mounted, a light hood shield projecting forwardly from the camera and having forwardly flaring side walls and top and bottom walls, said walls being hingedly connected together along their meeting edges for movement into and out of a folded position, a clamping frame about the rear end of said hood fitting snugly about the front end portion of a camera and secured thereon to detachably hold the hood on the camera, a band of yieldable material extending about the front end of said hood and adapted to be positioned against a television screen, the top wall of the hood being formed with a sighting opening midway the width of its rear portion, and a mirror in said hood mounted upon the rear portion of the bottom wall and located beneath the sight opening and disposed below the lens of the camera and directed toward the forward open end of the hood to enable a person to view the picture on the television screen through said sight opening.

WALTER F. KROEMMELBEIN, Jr.

REFERENCES CITED

The following references are of record in the file of this patent:

UNITED STATES PATENTS

| Number | Name | Date |
|---|---|---|
| 1,268,609 | Powell | June 4, 1918 |
| 1,885,555 | Schwartz | Nov. 1, 1932 |
| 2,239,379 | Bucky | Apr. 22, 1941 |
| 2,314,642 | Worcester | Mar. 23, 1943 |
| 2,339,657 | Smith | Jan. 18, 1944 |
| 2,431,825 | Pollock | Dec. 2, 1947 |
| 2,483,147 | Mol | Sept. 27, 1949 |
| 2,537,303 | Cobb et al. | Jan. 9, 1951 |